US006096993A

United States Patent [19]

Marhic et al.

[11] Patent Number: 6,096,993

[45] Date of Patent: Aug. 1, 2000

[54] SAFETY DEVICE FOR A PLASMA TORCH

[75] Inventors: Gerard Marhic, Cergy-Pontoise; Yannick Lepeule, Cinqueux, both of France

[73] Assignee: La Soudure Autogene Francaise, Paris Cedex, France

[21] Appl. No.: 09/353,798

[22] Filed: Jul. 15, 1999

[30] Foreign Application Priority Data

Jul. 15, 1998 [FR] France ................................ 98 09038

[51] Int. Cl.[7] ................................................ B23K 10/00

[52] U.S. Cl. ................................ 219/121.5; 219/121.54; 219/121.48; 219/121.45; 219/121.59

[58] Field of Search ........................ 219/121.39, 121.54, 219/121.59, 121.57, 121.5, 121.52, 74, 75, 121.46, 121.45

[56] References Cited

U.S. PATENT DOCUMENTS

| | | | |
|---|---|---|---|
| 4,814,577 | 3/1989 | Dallavalle et al. | 219/121.57 |
| 4,973,816 | 11/1990 | Haberman | 219/121.48 |

FOREIGN PATENT DOCUMENTS

| | | |
|---|---|---|
| 2 534 107 | 4/1984 | France . |
| 37 14 995 | 11/1988 | Germany . |
| 43 13 830 | 11/1994 | Germany . |
| 1-057982 | 3/1989 | Japan . |
| 2 192 821 | 1/1988 | United Kingdom . |

*Primary Examiner*—Mark Paschall
*Attorney, Agent, or Firm*—Young & Thompson

[57] ABSTRACT

Plasma torch (1) equipped with a torch head (1') including a nozzle holder (10) and a nozzle (4), the nozzle (4) being fixed to the nozzle holder (10) by the use of fixing elements (14). Safety electrical switch unit (3) controls the electric current supplied to the torch head (1'). A removable protective shroud (5) surrounds the torch head (1') and comprises, on the one hand, at least one actuating element (6) capable of interacting with the safety electrical switch unit (3) in order to make it possible to supply electric current to the torch head (1') and, on the other hand, retaining elements comprising a spring clip (8) capable of interacting with a circular groove of the nozzle (4) to allow the protective shroud (5) to be integrated with the nozzle (4). Such a plasma torch is useful for welding or cutting a piece of metal.

14 Claims, 3 Drawing Sheets

SAFETY DEVICE FOR A PLASMA TORCH

FIELD OF THE INVENTION

The present invention relates to a safety device for an electric-arc torch, in particular for a plasma cutting torch.

BACKGROUND OF THE INVENTION

The electrode of a plasma cutting torch, in particular a manual torch, is usually taken to high voltages while it is in use, often more than 100 V and sometimes up to 300 V.

While the torch is operating, the electrode is normally rendered inaccessible to the operator due to the presence of the nozzle of the torch which is positioned around the electrode in a way which is known in itself.

However, when it is necessary to dismantle the nozzle, for example during a maintenance operation on the torch, the electrode is then exposed, that is to say accessible to the operator.

This configuration now presents a real danger for the operator, who risks being electrocuted in the event of involuntary actuation of the control trigger of the torch.

In order to limit the risk for the operator, it is then appropriate either to prevent access to the pieces which are live when the torch is dismantled, or to prevent the current generator operating if certain pieces of the torch are not in place.

To do this, safety devices have already been proposed in the prior art, but these afford only a partial response to the abovementioned problem.

Thus the document EP-A-110736 proposes a safety system based on a check of the presence only of an insulating protective skirt arranged around the nozzle of the torch.

In other words, this system does not take into account the presence of the nozzle, and an operator who is distracted may refit this protective skirt while omitting to replace the nozzle, which would enable access to the electrode by the operator and would thus be likely to expose the latter to a significant risk of electrocution by contact with the live pieces, especially the electrode.

Other safety systems have, moreover, been proposed by the documents DE-A-4313830, GB-A-2192821, FR-A-275270, JP-A-01057982, FR-A-2450659, US-A-3,488,466 and US-A-3,632,951. However, these known configurations still do not give complete satisfaction, especially due to the difficulty of implementation, their inadequate safety level and/or their high cost of manufacture.

Moreover, the document DE-A-3714995 describes a plasma torch equipped with a nozzle about which a protective shroud is arranged comprising a safety system comprising an electrical switch capable of being actuated by a moveable push rod in elongate form, this push rod being formed in a housing situated within the torch body. According to this document, the push rod interacts with the nozzle by means of a moveable annular component. Moreover, the protective shroud is mounted on the body of the torch.

SUMMARY OF THE INVENTION

The purpose of the present invention is thus to solve the abovementioned problem by proposing a safety system for an electric-arc work torch, particularly for a manual plasma cutting torch, making it possible to check the simultaneous presence, that is to say the correct fitting, not only of the nozzle surrounding the electrode of the torch but also of the insulating protective skirt surrounding the nozzle.

In other words, the present invention aims to enhance the known plasma torches.

Moreover, the safety system according to the invention should be easy to manufacture and of acceptable industrial cost.

The present invention thus relates to an electric-arc work torch comprising:

- a torch head including at least one nozzle holder and a nozzle, the nozzle being fixed to the nozzle holder by the use of fixing means;
- safety electrical switch means controlling the supply of electric current to the torch head; and
- a removable protective shroud surrounding at least a part of the torch head, the protective shroud including:
  - at least one actuating means capable of interacting with the safety electrical switch means in order to make it possible to supply the torch head with electric current; and
  - retaining means capable of interacting with at least the nozzle so as to allow the protective shroud to be integrated with at least the nozzle.

The electric-arc work torch according to the invention may comprise one or more of the following characteristics, as the case may be:

- the actuating means is an axial extension, along the axis (x-x'), of the peripheral wall of the protective shroud.
- the retaining means include at least one spring clip arranged within the protective shroud.
- the spring clip is housed in a recess, for example an annular groove, formed in the inner peripheral wall of the shroud.
- the spring clip arranged within the protective shroud is capable of interacting with at least one recess formed peripherally to the nozzle, in such a way as to allow the protective shroud to be integrated with at least the nozzle.
- at least one recess is substantially circular and formed on the outer peripheral wall of the nozzle; the recess is preferably an annular groove.
- the protective shroud is integrated with at least the nozzle by clipping the spring clip into the recess formed peripherally to the nozzle; the clipping being the action of mounting, by force, an elastic member (here the spring clip) on a support endowed with a retaining force (here the nozzle and its groove).
- the electrical switch means are arranged in the handgrip of the torch.
- the protective shroud is produced from an electrically insulating material, such as a polymer material, associated with a ring, preferably metal, integral with at least a part of its inner wall carrying the housing for the spring clip.
- the protective shroud is produced as a single structure or component in electrically insulating material, preferably of at least one moulded or thermosetting polymer.

The invention relates, moreover, to a method of assembling a manual plasma torch comprising a torch head according to the invention, including at least one nozzle holder and one nozzle, safety electrical switch means and a removable protective shroud including an actuating means, in which the following successive steps are carried out:

- a/the nozzle is positioned and fixed in the nozzle holder by the use of fixing means,
- b/the protective shroud is positioned and fixed onto the torch head, in such a way that:

the actuating means of the shroud interact with the safety electrical switch means in order to allow the torch head to be supplied with electric current, and retaining means carried by the shroud interact with the nozzle in order to fix and hold the shroud on at least the nozzle.

The torch according to the invention can be used in any manual plasma-arc cutting or manual welding process.

BRIEF DESCRIPTION OF THE DRAWINGS

The invention will now be described in further detail with the aid of the attached figures of two possible embodiments of the invention, given by way of illustration but not limiting.

DESCRIPTION OF THE PREFERRED EMBODIMENTS

Figure 1:
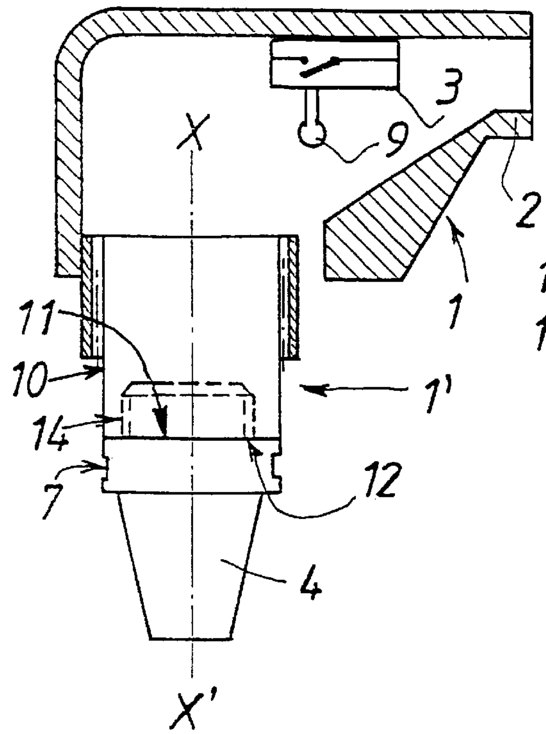
FIGS. 1 to 4 represent diagrams, in longitudinal section and in side and partial view, of a manual plasma cutting torch 1 according to a first embodiment of the invention.

The plasma cutting torch 1 according to the first embodiment. in accordance with the present invention, comprises a torch head 1' carrying an nozzle holder 10 and a nozzle 4, the nozzle 4 being fixed to the nozzle holder 10 by the use of fixing means 14, such as a threading, a tapping or the like.

It should be noted that FIG. 1 applies also to the second embodiment given below.

The plasma torch 1 includes a handle 2, partially represented here, within which are arranged electrical switch means 3 comprising a control member 9 making it possible to control the turning on and off of the current supply to the torch head 1'.

In order to limit the risks of electrocution of the operator, a removable protective shroud 5, preferably of an insulating material, such as a polymer, is placed axially around a part of the torch head 1', that is to say that this protective shroud 5 surrounds a part of the nozzle holder 10 and of the nozzle 4 in the manner of a sleeve.

More precisely, the removable protective shroud 5 includes an actuating means 6, such as an axial extension of the peripheral wall of the shroud along the axis (x, x'), the actuating means 6 or axial extension is capable of interacting with the control element 9 of the electrical switch means so as to enable the torch head 1' to be supplied with electric current while the torch 1 is in use.

In this first embodiment, the protective shroud 5 consists of three parts 8, 13 and 23, capable of interacting with some or all of the elements making up the torch head 1', preferably with the nozzle 4, in order to make it possible to fix and hold the said protective shroud 5 on the said torch head 1'.

In fact, the three parts 8, 13 and 23, acting as retaining means, comprise a spring clip 8, a fixed part 23 and a moveable part 13 the function of which is to compress the spring clip 8 by sliding along the substantially conical inner surface of the moveable part 13 and/or of the fixed part 23.

Hence the spring clip 8 interacts with a peripheral recess 7, such as a circular groove, formed at the periphery of the upper part 12 of the nozzle 4, the spring clip 8 penetrating at least partially into the peripheral groove 7 when the shroud 5 is put in place on the nozzle 4.

In detail, the assembling of the nozzle 4 and of the shroud 5, respectively, on the torch head 1' of the manual plasma torch 1 is carried out in the following way.

First of all the nozzle 4 is positioned and fixed on the nozzle holder 10 by the use of fixing means 14, such as a threading and a tapping, or any similar means.

Correct positioning of the nozzle 4 in the nozzle holder 10 is achieved, for example, when the upper bearing surface 12 of the nozzle 4 comes into abutment against the lower bearing surface 11 of the nozzle holder 10, as represented in FIG. 1, in which it can be seen that the nozzle 4 and the nozzle holder 10 are coaxial along the axis (x-x').

Figure 3:
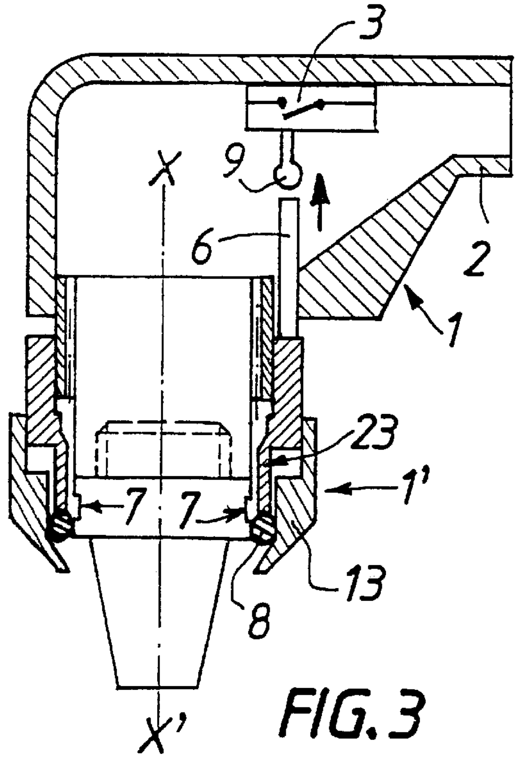
Figure 4:
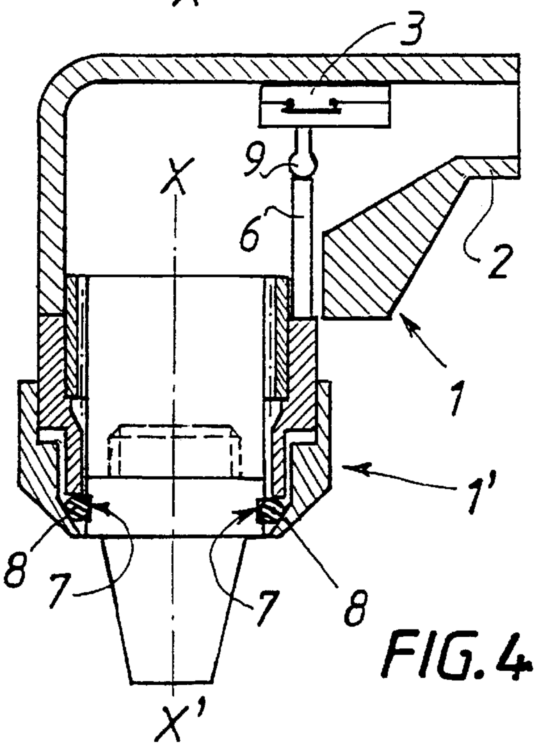

Next, the protective shroud 5 is positioned and fixed on the torch head 1' in such a way that the actuating means 6 of the shroud 5 interacts with the control element 9 of the electrical switch means 3 so as to make it possible to supply electric current to the torch head 1'. The protective shroud 5 is then held in position on the torch head 1' by virtue of the parts 8, 13 and 23, acting as retaining means, in particular by virtue of the spring clip 8 interacting with the recess 7, such as a groove, carried by the outer peripheral wall of the nozzle 4, as represented in FIGS. 3 and 4.

In other words, the spring clip 8 situated within the protective shroud 5, after the protective shroud 5 is correctly positioned on the torch head 1', is in position facing the groove 7 formed at the periphery of the nozzle, and it is then sufficient, by an appropriate means, such as a taper or the like, to squeeze the spring clip 8 so as to force it to penetrate partially into the groove 7 of the nozzle 4, in such a way as to integrate the two pieces, namely the nozzle 4 and the protective shroud 5, in working position.

When the protective shroud 5 is correctly mounted on the torch head 1', the extension or actuating means 6 of the shroud 5 interacts with the control element 9 of the electrical switch means so as to enable the power source to operate, that is to say the current generator or the like, and thus contribute to supplying electric current to the torch head 1'.

Figure 2:
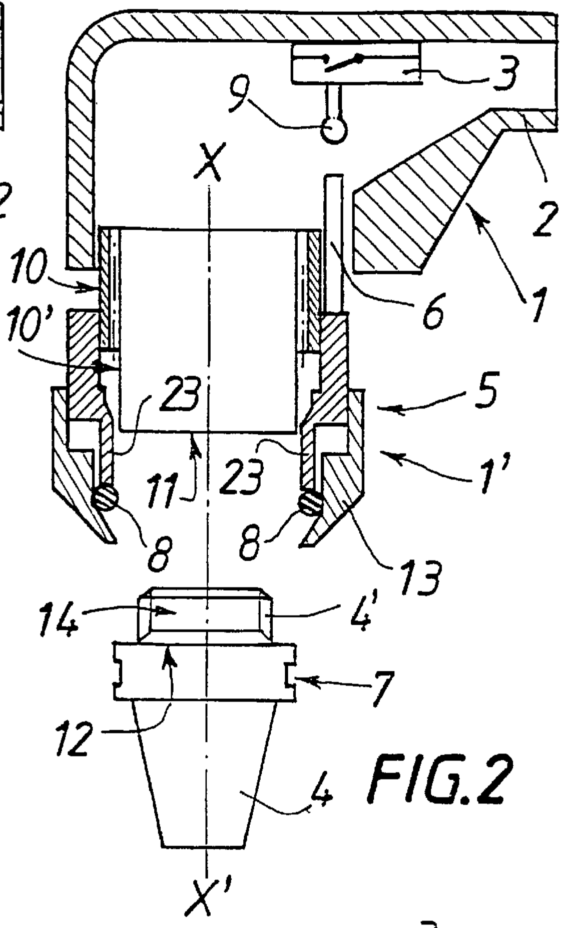

In contrast, as represented in FIG. 2, in the event of the nozzle 4 being omitted, the mounting of the protective shroud 5 alone considerably minimizes the risks of electrocution for the operator.

This is because, in this case, although the extension or actuating means 6 of the shroud 5 can penetrate into the inner space of the handle 2 of the torch 1 and thus activate the electrical switch 3, in this configuration the protective shroud 5 cannot be held in place and is automatically ejected as soon as the operator releases it, given that, with the nozzle 4 being absent, the protective shroud 5 cannot be held on the end of the torch head 1'.

In other words, the device according to the present invention exhibits an important advantage from the point of view of safety, to the extent that the operation of the power generator delivering the electric current can be enabled only when the nozzle 4 and the protective shroud 5, simultaneously, are correctly put in place on the torch head 1'.

It follows that, if the nozzle 4 is fitted but not the protective shroud 5, then the electrical switch 3 is not activated and the torch head 1' cannot be supplied with electric current.

Conversely, if only the protective shroud is mounted, then it cannot be held in place on the torch head 1' and is automatically ejected as soon as the operator releases it.

Hence the risk of electrocution is greatly reduced.

Moreover, FIGS. 5 to 8 represent diagrams of a second embodiment of a manual plasma cutting torch 1 in accordance with the present invention; this second embodiment being preferred.

Figure 5:
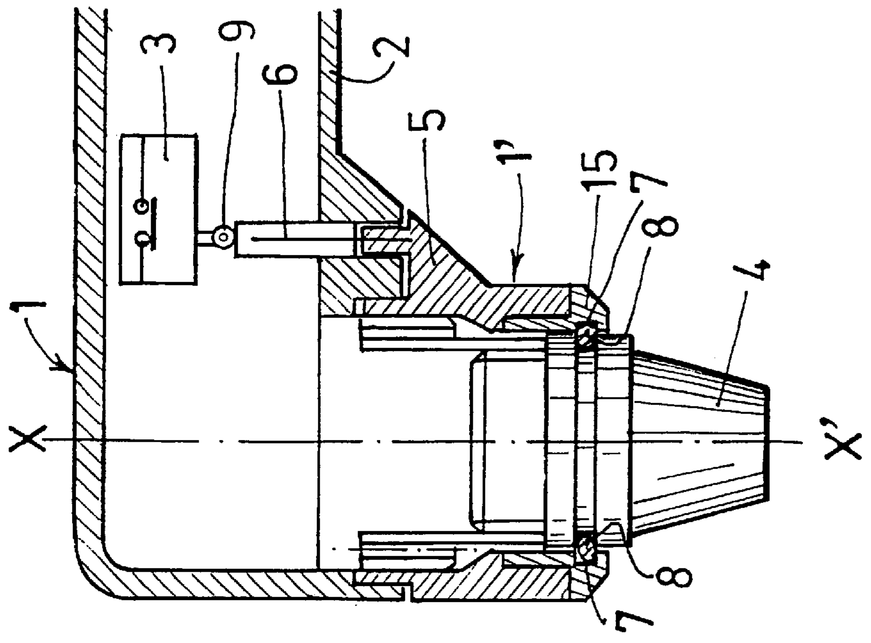

More precisely, it can be seen in FIG. 5 that, as before, the torch head 1' comprises a nozzle holder 10 and a nozzle 4 fixed to the nozzle holder 10 by the use of fixing means 14, for example a threading, a tapping or the like.

Here again, the electrical switch means 3 equipped with a control element 9 making it possible to control the turning on and of the turning off of the electric current supply to the torch head 1' are formed in the handle 2 of the plasma torch 1.

Likewise, according to this second embodiment, the removable shroud 5, placed axially around at least a part of the head 1', includes an actuating means 6, such as an axial extension of the peripheral wall of the shroud along the axis (x, x'), which actuating means 6 is capable of interacting with the control element 9 of the electrical switch means so as to enable the supply of electric current to the torch head 1' while the torch 1 is in use.

Figure 6:
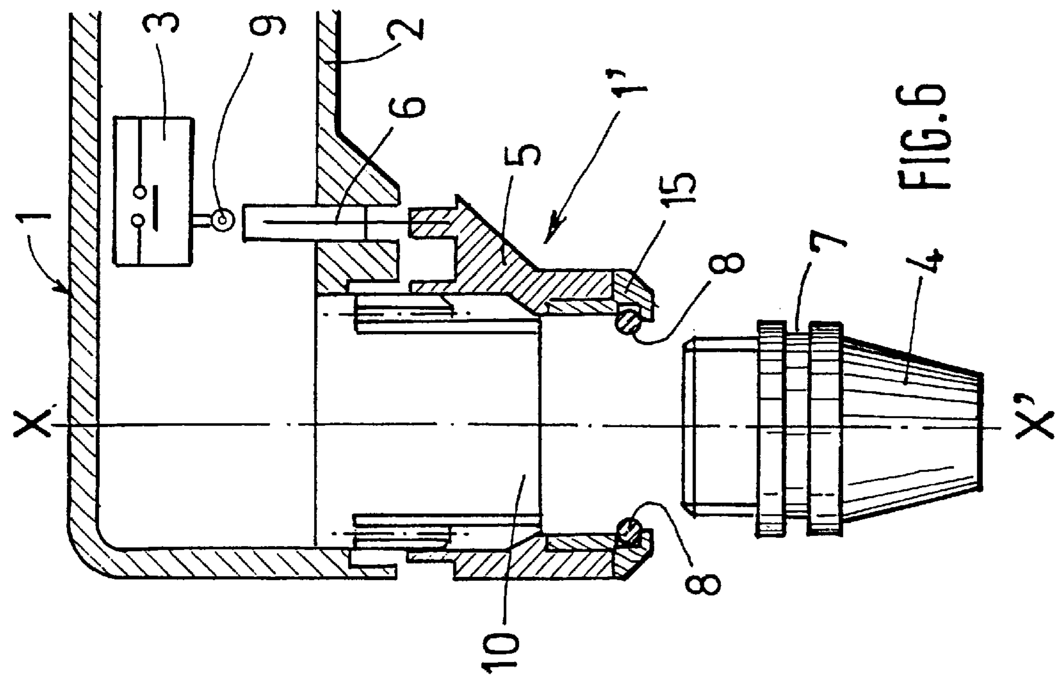
FIGS. 5 to 8 represent diagrams of a second preferred embodiment of a manual plasma cutting torch 1 according to the invention.

The assembling of the nozzle 4 and of the shroud 5, respectively, onto the torch head 1' of the manual plasma torch 1 is carried out in the way set out above, with the exception of the fact that, according to this second embodiment, the protective shroud 5 is held in position on the torch head 1' directly by virtue of the spring clip 8 which interacts with the recess 7, for example a groove, carried by the outer peripheral wall of the nozzle 4, when the shroud 5 is clipped onto the nozzle 4, as can be deduced from FIGS. 5 and 6.

This is because, in this second embodiment, the shroud is formed as a single piece and not from several moveable sub-parts acting as retaining means as in the first embodiment.

As can be seen in FIGS. 5 and 6, the shroud 5, produced from example from a polymer material fastened onto a metal ring, consists of a single structure carrying the spring clip 8 inserted permanently into a recess or a groove formed on its inner peripheral wall.

It follows then that the spring clip 8 situated within the shroud 5, after correct positioning and clipping of the shroud 5 onto the head 1, is again in the groove 7 formed at the periphery of the nozzle 4, which makes it possible to integrate the nozzle 4 and the shroud 5, that is to say to fix them firmly.

In other words, the spring clip 8 penetrates at the least partially into the peripheral groove 7 of the nozzle 4, when the shroud 5 is put in place by clipping onto the nozzle 4, the spring clip 8 being inserted into the circular groove 7.

For greater effectiveness, the internal diameter of the spring clip 8 is substantially equal to or slightly less than the outer diameter of the nozzle 4 measured in or at the bottom of the circular groove 7.

By way of example, the internal diameter of the spring clip 8 may be equal to about 17 mm and the outer diameter of the nozzle 4 measured at the bottom of the circular groove 7 may itself be smaller by a few tenths of a mm.

Moreover, the protective shroud 5 carries a metal ring 15 integral with a part of its internal wall, the ring 15 being associated with the spring clip 8, in such a way as to allow better thermal and mechanical behaviour of this part of the skirt.

As before, the actuating means 6 formed by an axial extension of the shroud 5 interacts with the control element 9 of the electrical switch means in order to enable electric current to be supplied to the head 1'. In the event of the nozzle 4 being omitted, the risks of electrocution for the operator are greatly diminished since, as explained above, the protective shroud 5 cannot be held in place and is automatically ejected as soon as the operator releases it and the torch head 1' cannot be continuously supplied with electric current. By analogy, in the event of the protective shroud 5 being omitted, the torch head 1' cannot be supplied with electric current since the actuating means 6, that is to say the axial extension of the shroud 5, cannot interact with the control element 9 of the electrical switch means to enable the head 1' to be supplied with electric current.

Figure 8:
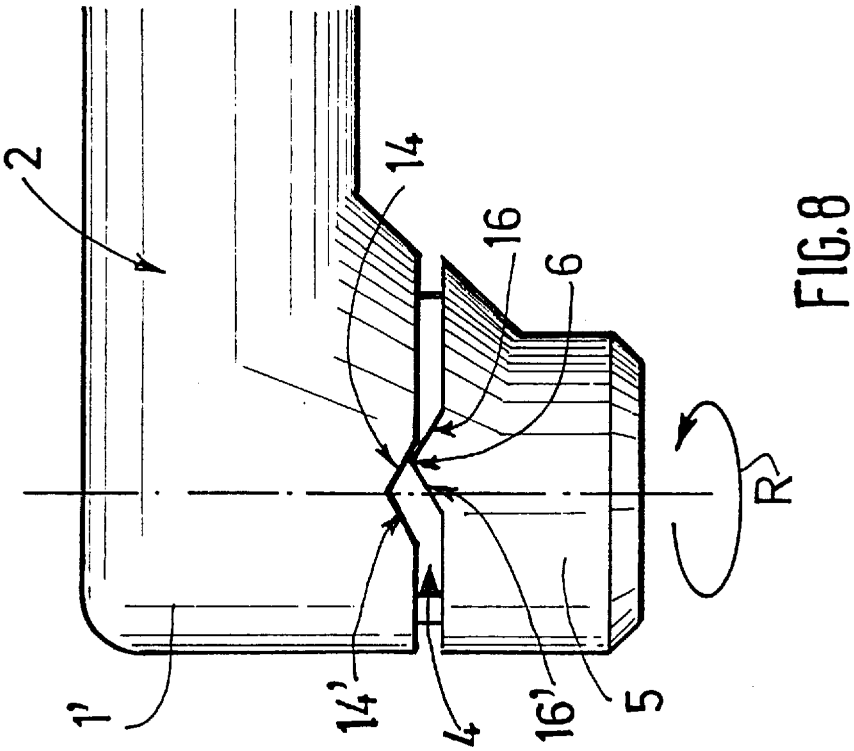
Figure 7:
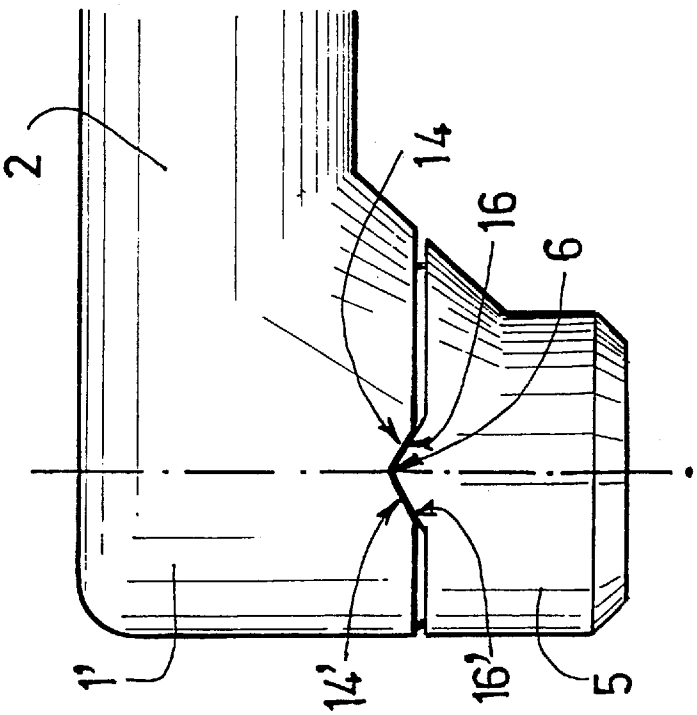

Moreover, as shown in FIGS. 7 and 8, in order to facilitate removal of the shroud 5, the protective shroud 5 includes a first bearing face comprising at least one first ramp, preferably two ramps 16 and 16'. Advantageously, the first ramps 16, 16' of the protective shroud 5 are carried by the axial extension 6 of the peripheral wall of the shroud 5 and constitute the bearing faces of this axial extension 6.

Likewise, the end of the torch head 1' includes a second bearing face comprising at least one second ramp, preferably two ramps 14 and 14'.

The ramps 16 and 16' have a shape, that is to say slopes, which are approximately equal or substantially complementary to those of the ramps 14 and 14', respectively.

It should be noted that the ramp 14 may be of equal slope or differ from that of the ramp 14 and, likewise, the ramp 16 may be of equal slope or differ from that of the ramp 16'.

In the operating position (see FIG. 7), that is to say when the protective shroud 5 is mounted firmly on the torch head 1', the first and second bearing faces, and thus also the ramps 16, 16' and ramps 14, 14' to come, respectively, into contact with one another; the spring clip 8 of the shroud 5 then being inserted by clipping into the annular groove 7 carried by the nozzle 4, as explained above.

Conversely, when it is desired to remove the protective shroud 5, that is to say to unfasten it from the torch head 1', it is sufficient, as shown diagrammatically in FIG. 8, for the operator to exert a rotational force (arrow R) on the shroud 5, so as to generate a slipping of the ramp 16 on the ramp 14, or of the ramp 16' on the ramp 14' which will then be translated into a forced separating movement of the shroud 5 relative to the torch body 1'; the first and second bearing faces separating from one another. This forced separation of the shroud 5 with respect to the body 1' then generates, in parallel, a forced separation of the shroud 5 with respect to the nozzle 4 which is fixed to the body 1', which tends to free the spring clip 8 from the annular groove 7 carried by the nozzle 4, that is to say an unclipping of the spring clip 8 thus allowing the shroud 5 to be unfastened from the nozzle 4 and thus from the body 1'.

It will be understood that the presence of such ramps 14, 14', 16 and 16' is particularly advantageous by considerably easing the dismantling operations.

In general, the present invention markedly enhances the safety of use of a plasma torch, in particular a manual torch, which is equipped with it.

What is claimed is:

1. A plasma torch comprising:

a torch head including at least one nozzle holder and a nozzle, the nozzle being fixed to the nozzle holder by fixing means;

safety electrical switch means for controlling the supply of electric current to said torch head; and a removable protective shroud surrounding at least a part of the torch head, said protective shroud including:

at least one actuating means structured and arranged to interact with the safety electrical switch means in order to make it possible to supply the torch head with electric current; and retaining means structured and arranged to interact with at least the nozzle so as to allow the protective shroud to be integrated with at least the nozzle.

2. The torch according to claim 1, wherein the actuating means are an axial extension of the peripheral wall of the protective shroud.

3. The torch according to claim 1, wherein the retaining means include at least one spring clip arranged within the protective shroud; said spring clip being housed in a first recess formed in the inner peripheral wall of the protective shroud.

4. The torch according to claim 3, wherein the spring clip arranged within the protective shroud is capable of interacting with at least one second recess formed peripherally to the nozzle, in such a way as to allow the protective shroud to be integrated with at least the nozzle.

5. The torch according to claim 4, wherein the second recess is substantially circular and formed on the outer peripheral wall of the nozzle.

6. The torch according to claim 5, wherein the second recess is an annular groove.

7. The torch according to claim 4, wherein the protective shroud is integrated with at least the nozzle by clipping the spring clip into the second recess.

8. The torch according to claim 1, wherein the electrical switch means are arranged in a handgrip of the torch.

9. The torch according to claim 1, wherein the protective shroud is produced as a single electrically insulating piece from at least one electrically insulating material.

10. The torch according to claim 9, wherein the electrically insulating material is a polymer.

11. The torch according to claim 3, wherein the protective shroud carries a metal ring integral with at least one part of its inner wall; said metal ring being associated with said spring clip.

12. The torch according to claim 1, wherein the protective shroud includes a first bearing face comprising at least one first ramp, and an end of the torch head includes a second bearing face comprising at least one second ramp, at least a part of the first and second bearing faces, and at least the first and second ramps being structured and arranged to come, respectively, into contact with one another when the protective shroud is mounted firmly on the torch head; at least one first ramp of the protective shroud being carried by an axial extension of the peripheral wall of the shroud.

13. Method of plasma-arc welding or cutting, which comprises providing a plasma torch comprising:

a torch head including at least one nozzle holder and a nozzle, the nozzle being fixed to the nozzle holder by fixing means;

safety electrical switch means for, controlling the supply of electric current to said torch head; and a removable protective shroud surrounding at least a part of the torch head, said protective shroud including:

at least one actuating means structured and and arranged to interact with the safety electrical switch means in order to make it possible to supply the torch head with electric current; and retaining means structured and arranged to interact with at least the nozzle so as to allow the protective shroud to be integrated with at least the nozzle; and using said plasma torch to weld or cut.

14. Method of assembling a manual plasma torch comprising:

a torch head including at least one nozzle holder and a nozzle, the nozzle being fixed to the nozzle holder by fixing means;

safety electrical switch means for controlling the supply of electric current to said torch head; and a removable protective shroud surrounding at least a part of the torch head, said protective shroud including:

at least one actuating means structured and arranged to interact with the safety electrical switch means in order to make it possible to supply the torch head with electric current; and retaining means structured and arranged to interact with at least the nozzle so as to allow the protective shroud to be integrated with at least nozzle, the method comprising the following sequential steps:

a) positioning and fixing the nozzle in the nozzle holder with the fixing means;

b) positioning and fixing the protective shroud onto the torch head, such that:

the actuating means carried by the shroud interact with the safety electrical switch means in order to allow the torch head to be supplied with electric current; and the retaining means for retaining the protective shroud interact with the nozzle in order to fix and hold the protective shroud on at least the nozzle.

* * * * *